United States Patent [19]

Rieder

[11] 4,058,819

[45] Nov. 15, 1977

[54] ANALOG/DIGITAL CONTROL ARRANGEMENT FOR PHOTOGRAPHIC APPARATUS

[75] Inventor: Alois Rieder, Munich, Germany

[73] Assignee: AGFA-Gevaert, A.G., Leverkusen, Germany

[21] Appl. No.: 583,503

[22] Filed: June 3, 1975

Related U.S. Application Data

[62] Division of Ser. No. 537,668, Dec. 30, 1974, Pat. No. 3,972,607.

[51] Int. Cl.² .............................................. G03B 7/08
[52] U.S. Cl. ................................... 354/44; 354/23 D; 354/42; 354/43; 354/60 A
[58] Field of Search ................. 354/23D, 29, 30, 38, 354/40, 42, 43, 44, 50, 51, 60 R, 60 A; 352/141; 353/101

[56] References Cited

U.S. PATENT DOCUMENTS

| 3,813,680 | 5/1974 | Wagensonner et al. | 354/44 |
| 3,882,522 | 5/1975 | Erlichman | 354/30 |
| 3,900,855 | 8/1975 | Stempeck | 354/38 |
| 3,903,528 | 9/1975 | Kee | 354/5 |
| 3,987,462 | 10/1976 | Wagensonner | 354/44 |

Primary Examiner—Russell E. Adams
Attorney, Agent, or Firm—Michael J. Striker

[57] ABSTRACT

A bridge circuit which includes a photoelectric transducer furnishes input signals to a differential amplifier whose analog output signal varies in correspondence to the bridge unbalance. A first and second bistable threshold circuit changes the analog output signal into digital signals signifying bridge unbalance in a first direction, balance, and unbalance in the opposite direction, a motor is energized to rotate in a direction corresponding to the direction of bridge unbalance. The motor can be utilized to move the objective lens of a slide projector or change the aperture of a diaphragm.

9 Claims, 2 Drawing Figures

ANALOG/DIGITAL CONTROL ARRANGEMENT FOR PHOTOGRAPHIC APPARATUS

This is a division of application Ser. No. 537,668, filed Dec. 30, 1974, now U.S. Pat. No. 3,972,607.

BACKGROUND OF THE INVENTION

This invention relates to photographic apparatus having an automatic control system including at least one light-sensitive element which is included in a bridge circuit whose output is in turn applied to the inputs of a differential amplifier. The output of the differential amplifier is used to furnish a signal controlling apparatus which rebalances the bridge. The control means must be able to move in a first or second direction in order to achieve this rebalance.

SUMMARY OF THE INVENTION

In accordance with the present invention photographic apparatus includes photoelectric transducer means for furnishing a light-dependent signal varying as a function of light falling thereon. It further comprises balancable circuit means, including said photoelectric transducer means, for furnishing a first signal having a determined characteristic varying in dependence upon the balance, unbalance, and direction of said unbalance of said balanceable circuit means. Further comprised are first and second bistable circuit means connected to said balancable circuit means and responsive to said determined characteristic of said first signal for furnishing a first, second and third digital output signal when said balanceable circuit means is unbalanced in a first direction, balanced, and unbalanced in a second direction respectively. Further comprised in the present invention are control means having an energizing circuit connected to said first and second bistable circuit means for varying the light falling on said photosensitive transducer means in response to said first and third combinations of digital output signals in a direction to rebalance said balanceable circuit means.

It will be seen that the bistable circuit means of the present invention convert the analog signal at the output of the differential amplifier into digital signals. The digital signals are then used to control the generally electromagnetic control means which function to rebalance the balanceable circuit means.

More specifically, a logid NAND-gate is connected to the output of the first and second bistable circuit means and furnishes an energizing signal whenever the balancable circuit means are not in balance. The direction of unbalance is indicated by the absence of presence of a signal at the output of the first bistable circuit means.

The above-described system can be utilized in a number of different types of photographic apparatus. For example, in a slide projector the movement of the objective is controlled by a motor whose energization depends on the absence or presence of the energizing signal and the current flow through which (therefore the rotations thereof) being determined by the absence or presence of a signal at the output of the first bistable circuit means. The motor, in addition to moving the objective, also moves a source of illumination relative to a first and second light-sensitive element which forms part of the balancable circuit means. When the circuit is re-balanced, the objective lens is in the proper position for effecting a sharp focus.

In an aperture control circuit, the present invention furnishes the energizing signal to a step motor whose direction of rotation is controlled by the output of the first bistable circuit means. The step motor is coupled to the main diaphragm to control the aperture thereof and is also coupled to an auxiliary diaphragm controlling the quantity of light falling on the photoelectric transducer means of the balanceable circuit means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
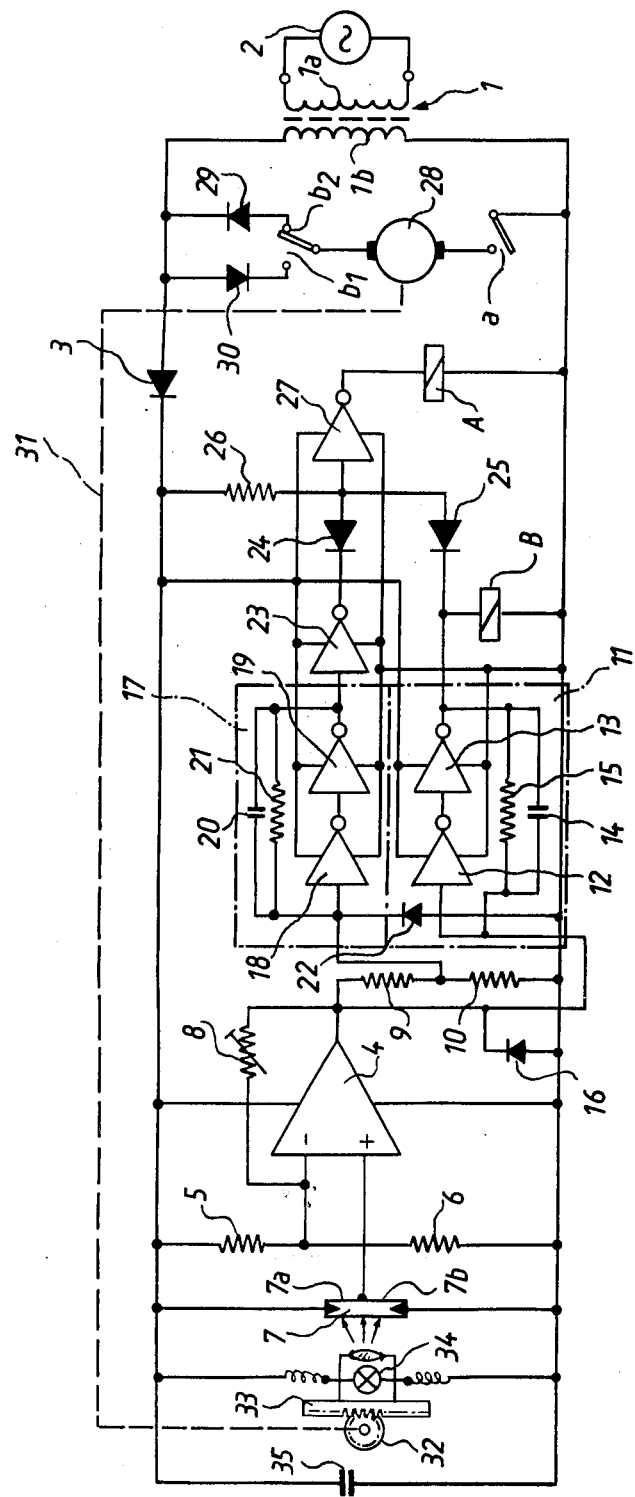
FIG. 1 shows an analog/digital control arrangement for automatic focussing in slide projectors.

A preferred embodiment of the present invention will now be described with reference to the drawing.

In FIG. 1, reference numeral 1 refers to a transformer whose input winding 1a is connected to a source of AC voltage 2 and whose secondary winding 1b is connected through a rectifier 3 to an operational amplifier 4. The inverting input of operational amplifier 4 is connected to the tap of a voltage divider comprising resistors 5 and 6. The direct input of the operational amplifier is connected with a photoresistor 7 (one embodiment of photoelectric transducing means) which comprises a first half 7a and a second half 7b. Both of the photoresistor halves 7a, 7b in conjunction with resistors 5 and 6 constitute a bridge circuit, namely a preferred embodiment of balanceable circuit means. A feedback resistor 8 is connected to operational amplifier 4. Two load resistors of operational amplifier 4 are denoted by reference numerals 9 and 10. The output of operational amplifier 4 is directly connected to the input of a first bistable circuit 11 which comprises two inverters 12, 13, connected in cascade having the parallel combination of a capacitor 14 and a resistor 15 as feedback circuit. A diode 16 connects the output of operational amplifier 4 to one side of the supply. The common point of resistors 9 and 10 is connected to the input of the second bistable circuit means which include a stage 17 including a first and second inverter 18, 19, connected in cascade and having a feedback circuit including the parallel combination of a capacitor 20 and a resistor 21. The second bistable circuit means further comprise an inverter 23 connected to the output of inverter 19. A diode 22 connects the input of the second bistable circuit means to one side of the supply.

An AND-gate including a diode 24 and a diode 25 as well as a resistor 26 has a first and second input respectively connected to the output of the first bistable circuit means and the output of inverter 23 namely the output of the second bistable circuit means. An inverter 27 is connected to the output of the AND-gate and converts it into a NAND-gate. At the output of the NAND-gate is connected the coil of a relay A. The output of inverter 27 is herein referred to as the energizing signal. Similarly, the output of stage 11 is referred to as the direction signal and, when present, energizes the coil of a relay B.

The contact $a$ of relay A is connected into the energizing circuit of an electromotor 28. A selector switch having contacts $b_1$ and $b_2$ associated with relay B connects electromotor 28 either to a diode 29 or to a diode 30. Diode 29 allows current to flow in the first direction while diode 30 allows the current to flow in the opposite direction. A mechanical connection exists between electromotor 28 and a gear drive 32, 33. This gear drive causes a source of illumination, here a lamp 34, moved relative to photoresistor 7. Further moved by the gear drive is the objective lens (not shown). The position of lamp 34 relative to photoresistor 7 therefore corresponds to the position of the objective. A capacitor 35 serves to smooth the voltage applied by rectifier 3.

The above-described arrangement operates as follows: The circuit is designed so that when the bridge is balanced the input voltage to the first threshold means exceeds its threshold value causing it to change from a first to a second stable state. However, the voltage input to the second bistable circuit means, namely stage 17 and inverter 23, does not exceed the threshold value and this circuitry therefore remains in the first stable state. The circuit is so designed that when in the first stable state, a low output voltage results while, when in the second stable state, a high output voltage results. Therefore, the signal at the output of stage 11 will be high while that of the output of stage 17 will be low causing the output of inverter 23 to be high. Since two "1" signals are applied to the inputs of the NAND-gate, its output will be low causing relay A to be deenergized. Contacts $a$ in the motor circuit will thus be open and the motor will be deenergized. Thus no corrective motion occurs when the circuit is balanced.

Now let it be assumed that when the circuit is unbalanced in a first direction, the output voltage of operational amplifier 4 is zero so that the input neither to stage 11 nor to stage 17 exceeds the threshold value. Under this condition, the output of inverter 23 will be high and the output stage 11 will be low. Relay B will be deenergized causing the selector switch to be in the position shown in the drawing. However relay A will be energized since the output of inverter 27 will be high. Thus switch $a$ will close allowing the motor to operate until the balance condition of the bridge circuit has been restored.

In the third case the bridge circuit is unbalanced in the second direction. Under this condition the output voltage of differential amplifier 4 will be sufficiently high to cause the threshold of both stage 11 and stage 17 to be exceeded. Relay B is thus energized causing the selector switch contacts to switch to contact $b_1$ thereby reversing the current flow through motor 28. Further, since the output of stage 17 will be high, that of inverter 23 will be low causing a "0" and a "1" to be applied to the NAND-gate thereby causing a high output at inverter 27. This causes relay A to be energized closing contact $a$ and allowing the energization of motor 28. Motor 28 then moves the gearing 32, 33 in such a way that lamp 34 is repositioned relative to photoresistor 7 and also simultaneously moves the objective. When the bridge is balanced, the output voltage of operational amplifier 4 will still be sufficiently high to maintain stage 11 in the second stable state, but will no longer be sufficient to maintain circuit 17 in the second stable state. The output of inverter 23 will thus be a "1" while the output of circuit 11 will remain a "1." Relay A will be deenergized, while relay B will remain energized. As soon as relay A is deenergized of course motor 28 stops. It is thus seen that the circuit of the present invention as shown in FIG. 1 will tend to return the bridge circuit to the balanced state.

Figure 2:
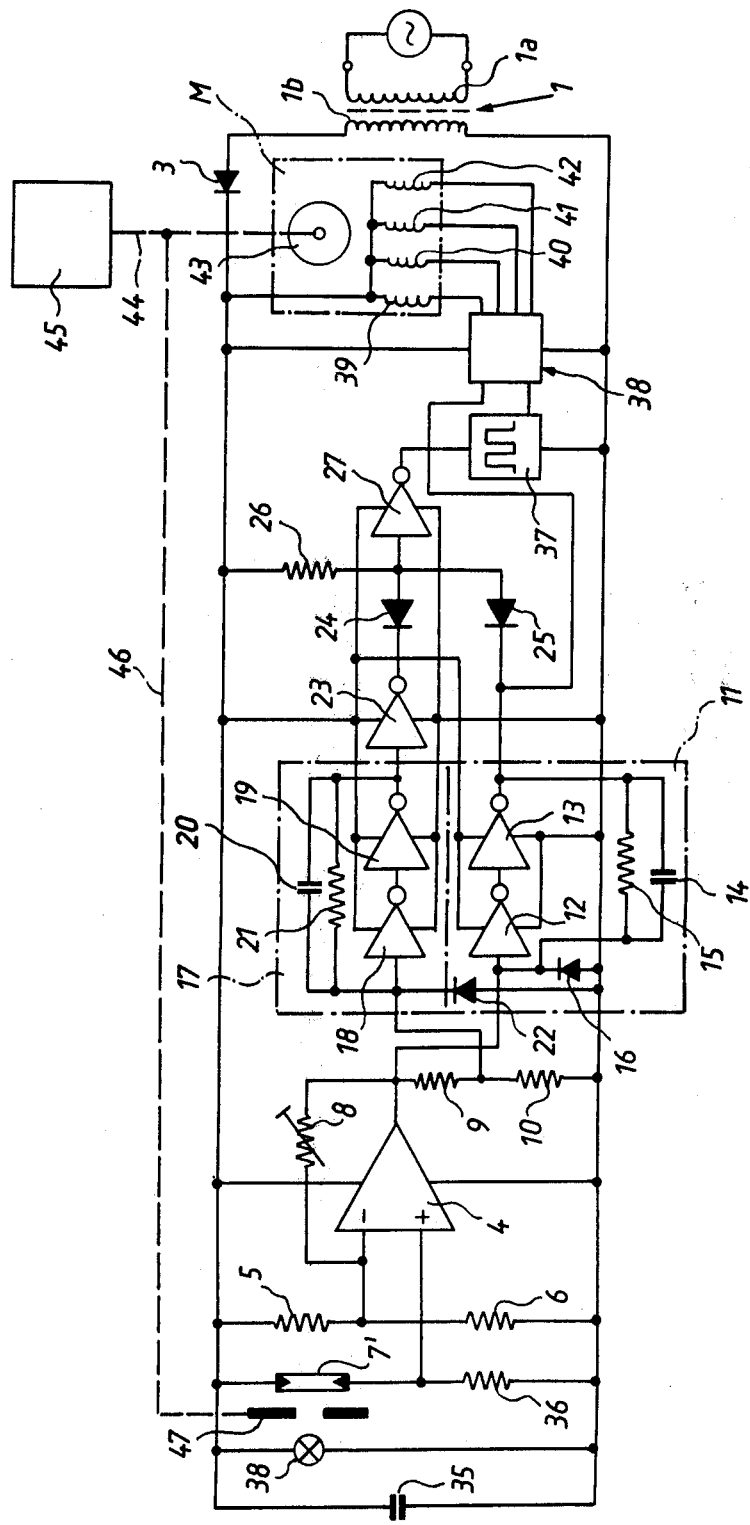
FIG. 2 shows an automatic control arrangement for stepwise adjustment of the aperture of a diaphragm.

Referring now to FIG. 2, it will be noted that those elements which are the same in FIG. 1 as in FIG. 2 have the same reference numerals. FIG. 2 differs from FIG. 1 in that the output of inverter 27 is connected to the enabling input of a pulse generator 37 which, when so enabled, energizes a step motor control circuit 38. Circuit 38 causes the pulses applied thereto to be applied in a predetermined sequence to the windings 39, 40, 41 and 42 of step motor M. The armature of the step motor is denoted by reference numeral 43. It is mechanically coupled by a coupling 44 to the diaphragm 45. A further mechanical connection 45 allows simultaneous adjustment of an auxiliary diaphragm 47 positioned between light 38 and a photoresistor 7'. Photoresistor 7' constitutes a part of a bridge circuit and is connected in series with a resistor 36. As in FIG. 1, the resistors further constituting the bridge circuit have reference numerals 5 and 6. The operation of the circuit is similar to that of FIG. 1. Again, when the bridge circuit is balanced the threshold values for stage 11 is exceeded while that for stage 17 is not. The resulting "0" output at inverter 27 blocks pulse generator 37 and therefore causes step motor M to remain at rest. When the circuit is unbalanced in the first direction the output voltage of differential amplifier 4 is approximately equal to zero, thereby causing both stages 11 and 17 to remain in the first stable state. Again as in FIG. 1, this causes a "1" output at inverter 23 and a "0" output of stage 11. This combination causes the output of inverter 27 to be a "1" thereby allowing pulses to pass from pulse generator 37 through control circuit 38 to the windings 39-42 of step motor M. In the absence of a signal at the output of stage 11, circuit 38 operates to energize the windings in a first predetermined order. When the bridge circuit is unbalanced in the opposite direction, the windings will be energized in the opposite order and armature 43 to rotate in the opposite direction.

It is seen that the present invention allows a very simple conversion of the output signal of operational amplifier 4 to a digital signal signifying unbalance, namely the energizing signal at the output of inverter 27 and to a second digital signal indicative of the required direction for correction, namely the signal at the output of stage 11.

While the present invention has been shown to be interconnected with aperture control apparatus and with automatic slide focussing apparatus, it is of course in no way limited to these applications. It is further in no way limited to the particular embodiments of the digital circuit shown.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic device including an adjustable component, a regulating arrangement for effecting light-dependent regulation of the setting of an adjustable component, the regulating arrangement comprising, in combination, means for generating a light-dependent signal, including a bridge circuit comprised of at least one photosensitive element, the bridge circuit being balanced, imbalanced in one direction or imbalanced in the other direction in dependence upon the light incident upon the photosensitive element, and a difference amplifier having two inputs connected across diagonally opposite junctions of the bridge circuit, the difference amplifier producing at its output a voltage constituting the light-dependent signal; first and second bistable circuit stages each having its input connected to the output of the difference amplifier, each of the bistable circuit stages having a respective threshold voltage, each of the bistable circuit stages assuming a first state when the difference amplifier output voltage applied to its input is below its threshold voltage and a second state when the difference amplifier output voltage applied to its input is above its threshold voltage, the threshold voltages of the two bistable circuit stages having values such that when the bridge circuit is balanced the value of the difference amplifier output voltage is intermediate the values of the threshold voltages of the two bistable circuit stages; electromagnetic adjusting means activatable in a first direction to change the setting of the adjustable component in one direction and activatable in the opposite second direction to change the setting of the adjustable component in the opposite direction; activation-determining means connected to both bistable circuit stages and to the electromagnetic adjusting means, and operative for assuming in dependence upon the combination of the states of the two bistable circuit stages either a state permitting activation of the adjusting means or a state preventing activation of the adjusting means; and direction-selecting means connected to the first bistable circuit stage and to the electromagnetic adjusting means, operative for assuming a state setting the adjusting means for activation in one direction when the first bistable circuit stage is in its first stage and independently of the state of the second bistable circuit stage, and operative for assuming a state setting the adjusting means for activation in the opposite direction when the first bistable circuit stage is in its second state and independently of the state of the second bistable circuit stage.

2. In a photographic device as defined in claim 1, the activation-determining means comprising a comparator stage having two inputs each connected to the output of a respective one of the two bistable circuit stages and operative for producing at the output of the comparator stage a signal indicative of the combination of the states of the two bistable circuit stages, and means for preventing and permitting activation of the adjusting means in dependence upon the output signal of the comparator stage.

3. In a photographic device as defined in claim 2, wherein the comparator stage comprises an AND-gate having two inputs, further including an inverter stage, the inverter stage having an input connected to the output of one bistable stage and an output connected to one input of the AND-gate, the other input of the AND-gate being connected to the output of the other bistable stage.

4. In a photographic device as defined in claim 1, further including a source of energizing current for the adjusting means and means defining a current path for the adjusting means, the activation-determining means comprising a relay including a relay winding connected to the outputs of both bistable stages and energized in dependence upon the combination of states thereof and a relay switch connected in the current path of the adjusting means and capable of assuming one setting for closing the current path and another setting for interrupting the current path.

5. In a photographic device as defined in claim 4, the direction-selecting means comprising a relay including a relay winding connected to the output of the first bistable stage and energized in dependence upon the state of only the first bistable stage and a direction-reversing switch connected in the current path of the adjusting means and controlled by the relay winding.

6. In a photographic device as defined in claim 1, the adjustable component being an adjustable diaphragm located to intercept light incident toward the photosensitive element.

7. In a photographic device including an adjustable component, a regulating arrangement for effecting light-dependent regulation of the setting of the adjustable component, the regulating arrangement comprising, in combination, means for generating a light-dependent signal, including a bridge circuit comprised of at least one photosensitive element, the bridge circuit being balanced, imbalanced in one direction or imbalanced in the other direction in dependence upon the light incident upon the photosensitive element, and a difference amplifier having two inputs connected across diagonally opposite junctions of the bridge circuit, the difference amplifier producing at its output a voltage constituting the light-dependent signal; first and second bistable circuit stages each having its input connected to the output of the difference amplifier, each of the bistable circuit stages having a respective threshold voltage, each of the bistable circuit stages assuming a first state when the difference amplifier output voltage applied to its input is below its threshold voltage and a second state when the difference amplifier output voltage applied to its input is above its threshold voltage, the threshold voltages of the two bistable circuit stages having values such that when the bridge circuit is balanced the value of the difference amplifier output voltage is intermediate the values of the threshold voltages of the two bistable circuit stages; electromagnetic adjusting means activatable in a first direction to change the setting of the adjustable component in one direction and activatable in the opposite second direction to change the setting of the adjustable component in the opposite direction; activation-determining means connected to both bistable circuit stages and to the electromagnetic adjusting means, and operative for assuming in dependence upon the combination of the states of the two bistable circuit stages either a state permitting activation of the adjusting means or a state preventing activation of the adjusting means; and direction-selecting means connected to the first bistable circuit stage and to the electromagnetic adjusting means, and operative for assuming in dependence upon the state of only the first bistable circuit stage either a state setting the adjusting means for activation in the first direction or a state setting the adjusting means for activation in the second direction, the bistable circuit stages being comprised of inverter stages and feedback branches connecting together the outputs and inputs of the inverter stages.

8. In a photographic device including an adjustable component, a regulating arrangement for effecting light-dependent regulation of the setting of the adjustable component, the regulating arrangement comprising, in combination, means for generating a light-dependent signal, including a bridge circuit comprised of at least one photosensitive element, the bridge circuit being balanced, imbalanced in one direction or imbalanced in the other direction in dependence upon the light incident upon the photosensitive element, and a difference amplifier having two inputs connected across diagonally opposite junctions of the bridge circuit, the difference amplifier producing at its output a voltage constituting the light-dependent signal; first and second bistable circuit stages each having its input connected to the output of the difference amplifier, each of the bistable circuit stages having a respective threshold voltage, each of the bistable circuit stages assuming a first state when the difference amplifier output voltage applied to its input is below its threshold voltage and a second state when the difference amplifier output voltage applied to its input is above its threshold voltage, the threshold voltages of the two bistable circuit stages having values such that when the bridge circuit is balanced the value of the difference amplifier output voltage is intermediate the values of the threshold voltages of the two bistable circuit stages; electromagnetic adjusting means activatable in a first direction to change the setting of the adjustable component in one direction and activatable in the opposite second direction to change the setting of the adjustable component in the opposite direction; activation-determining means connected to both bistable circuit stages and to the electromagnetic adjusting means, and operative for assuming in dependence upon the combination of the states of the two bistable circuit stages either a state permitting activation of the adjusting means or a state preventing activation of the adjusting means; and direction-selecting means connected to the first bistable circuit stage and to the electromagnetic adjusting means, and operative for assuming in dependence upon the state of only the first bistable circuit stage either a state setting the adjusting means for activation in the first direction or a state setting the adjusting means for activation in the second direction, the electromagnetic adjusting means comprising a stepper motor having a rotatable armature coupled to the adjustable component and a plurality of successively energized angularly spaced stator windings, the activation-determining means comprising a pulse generator and means for turning the pulse generator on and off in dependence upon the combination of states of the two bistable circuit stages, the direction-selecting means comprising means for routing the pulses produced by the pulse generator to the windings of the stator motor in either one or the opposite sequence in dependence upon the state of the first bistable circuit stage to effect armature rotation in either one or the opposite direction.

9. In a photographic device as defined in claim 8, the adjustable component being a diaphragm located to intercept light incident toward the photosensitive element.

* * * * *